United States Patent Office 2,831,751
Patented Apr. 22, 1958

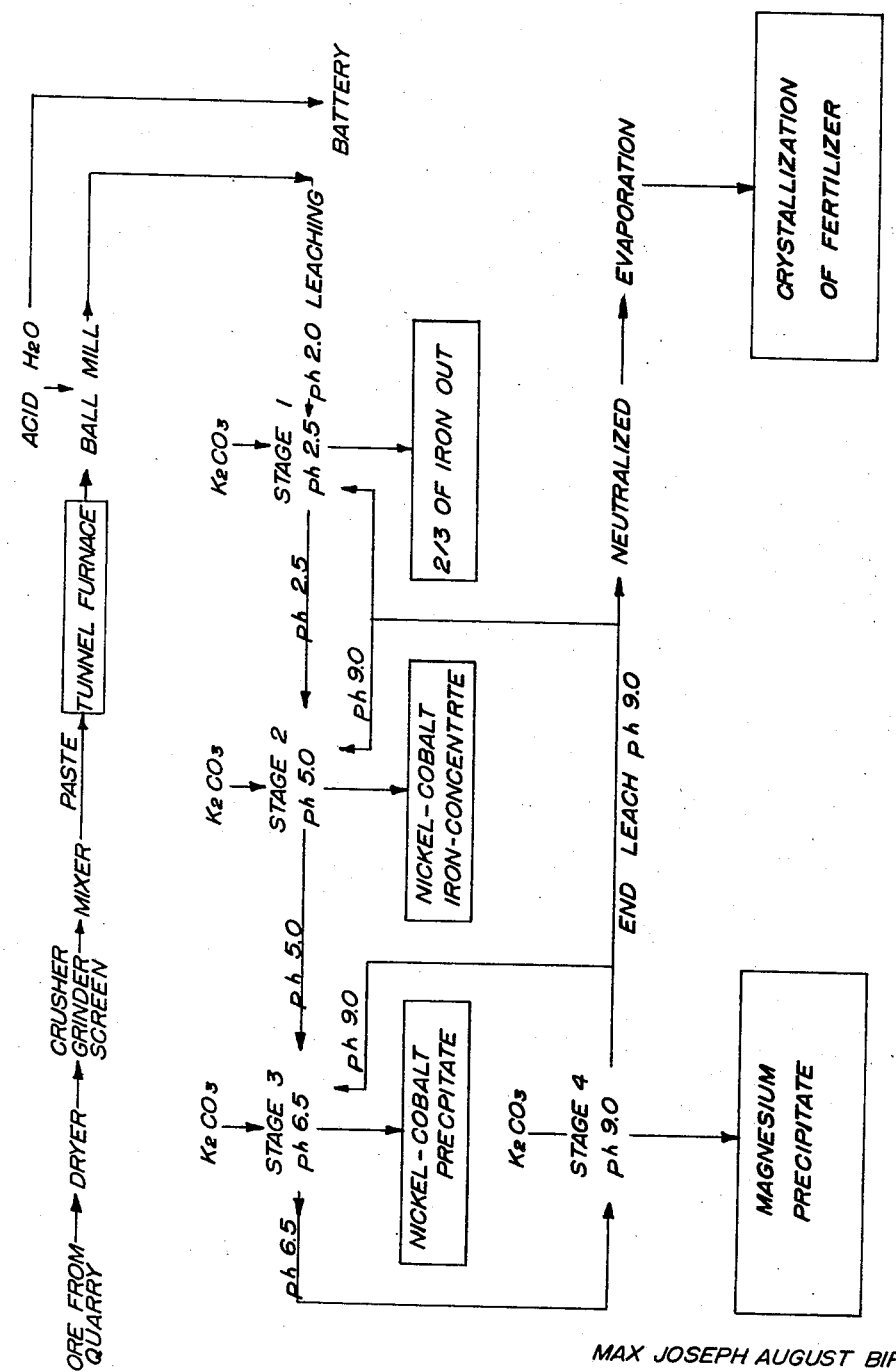

2,831,751

METHOD FOR RECOVERING NICKEL FROM ORES

Max Joseph August Birner, Toledo, Ohio, assignor of ninety percent to Joseph J. Schedel Application October 27, 1955, Serial No. 543,125

13 Claims. (Cl. 23—61)

This invention relates to method and means for recovering nickel from nickel-bearing ores and more especially to the recovery of nickel values from ores of very low grade.

Nickel bearing ores of the oxidic or latheritic type are usually of such low grade and nonresponsive to treatment by any of the concentration methods or processes and are not adaptable to be treated economically by present known metallurgical processes. Many endeavors have been made to process low grade ores by wet chemical methods, but the resultant high amounts of by-products dissolved together with the small amount of nickel and the necessity to separate or extract the nickel from the solution render such methods uneconomical and therefore prohibitive for commercial uses. Heretofore known processes have not resulted in by-products besides the nickel and cobalt which are recoverable in a pure and commercially usable form on an economically competitive basis, and hence large deposits of low grade ores have not been developed.

It is well known that oxidic and latheritic ores may be treated with mineral acids, rendering soluble nickel and cobalt salts and large amounts of dissolved by-products. The principal by-products encountered are iron when latheritic limonite ores are used or magnesium when serpentinic type ores are used. Acid treatment of such ores requires boiling the ore with comparatively strong acid solutions, and such processes are tedious, requiring large and costly vessels and long boiling periods. Attempts have been made to decompose sulphidic nickel-copper-concentrates with concentrated sulphuric acid utilizing only the heat of reaction and leaching the resulting slurry. Use of this process with oxidic nickel ores has proven unsatisfactory and uneconomical as only a minor portion of the total available nickel in the ore may be recovered by such process.

Other processes involve mixtures of oxidic nickel ores and salts such as ammonium sulphate such mixtures being baked at comparatively high temperatures in order to decompose the salt to facilitate action of the acid on the ore. This process is quite unsatisfactory and costly as there is substantial loss of acid through volatilization and incomplete or insufficient conversion of the compounds containing nickel into soluble salts. By repeated baking and leaching, only about 65% of the total nickel available in the ore could be recovered.

The present invention embraces a comparatively simple method or process of treating low grade nickel-bearing ore to separate the constituents into substantially pure commercially usable fractions and a nickel-cobalt concentrate by gradually changing the pH value or range of the extract.

An object of the invention is the provision of a method of treating nickel-bearing ores whereby practically total conversion of the nickel and cobalt compounds into soluble salts is attained in a continuous process with the expenditures of a minimum of energy and with no appreciable loss of acid.

Another major objective of the invention resides in a method by which substantially all of the nickel in low grade ores may be recovered and wherein other compounds are produced which are commercially salable whereby the nickel may be economically recovered by reason of the valuable by-products obtained in carrying on the process.

The accompanying flow sheet is illustrative of the steps involved in carrying out the method or process of the invention. The nickel-bearing ore is dried and crushed or ground until it is comparatively fine and preferably of particle size suitable to assure a complete and uniform reaction with the acid. The finely ground ore is conveyed to a mixer and thoroughly mixed with a concentrated mineral acid, preferably sulphuric acid, to form a thick paste.

The acid-ore paste is transferred to a conveyor preferably of the endless belt type and is passed through a tunnel furnace which is maintained at a substantially constant temperature. The mixture of ground ore and acid is heated until it attains a dry brick-like state. The baked material is delivered into a ball mill and is ground or abraded to powered or comminuted form suitable for leaching. The oven or tunnel furnace may be maintained at a desired heat to secure quick and practically total conversion of the nickel and cobalt compounds into soluble salts. I have found that conversion takes place at varying rates at temperatures between 50° centigrade and 700° centigrade. However most satisfactory conversion and best yield of soluble salts is attained at oven temperatures of from 90° centigrade to 300° centigrade and preferably below the boiling point of the acid employed in the reaction in order to reduce loss of acid through volatilization to a minimum. In the latter mentioned temperature range, the conversion is quick and efficient whereby between 90% and 100% of the total nickel and cobalt constituents in the ore are rendered leachable where the ore-acid mixture is subjected to heat in the furnace or oven for a period of from 15 minutes to 60 minutes dependent upon the selected temperature.

It will be seen from examples hereinafter set forth that at temperatures below 90° C. and above 300° C. there is an appreciable drop of the conversion rate particularly if less than the theoretical requirement or amount of acid is employed for the conversion of the acid reactable constituents or compounds in the ore.

After the heat treatment of the acid-ore mixture, the powdered material is delivered to a leaching bath or battery in countercurrent with, acid leaching water until no more nickel is detected in the filtered leach. By employing an acidulated leach, the formation and precipitation of basic salts are prevented. For example, the formation of basic ferrous salts would tend to occlude and precipitate substantial amounts of nickel and cobalt.

The acidity of the leach and its progressive diminution are important factors in the success of the process. Heretofore the conventional practice of leaching ore-slurries is accomplished with water under conditions fostering the rapid increase of the pH factor of the leach fluid and thereby impairs the effectiveness of the leaching to a substantial extent.

In the method of my invention, the leaching is carried on with the acidity of the leach water maintained at about pH 2 and at least below pH 2.5. The leach leaving the leaching battery with a pH of approximately 2.0 contains all the soluble components of the ore viz. nickel, cobalt, iron, magnesium and manganese. Other constituents such as silica, some of the iron and other impurities such as ferrochromite remain in the residue and such residue amounts to between 40% and 60% of the ore.

In the first extraction stage, the solution is subjected to accelerated aeration or other suitable means of oxidation and heat applied until the solution approaches the boiling temperature for most efficient and economical results. Under these conditions, the pH factor is gradually increased to pH 2.5 by the addition of an alkaline reagent such as a soluble carbonate or hydroxide viz. potassium carbonate or potassium hydroxide. The pH factor is maintained at 2.5 precipitating all of the iron that will precipitate at this value, the precipitate being filtered out of the leach. It has been found that about two thirds of the total amount of iron in the solution is extracted at this stage and is in the form of the basic ferric salt of the employed acid substantially free of other constituents as to be usable commercially in the manufacture of sponge iron or iron powder. Hence a commercially marketable by-product is obtained at the first extraction stage. Under certain operating conditions it is possible to gradually raise the pH approaching a value of 3.0 and some additional iron may be precipitated without loss of nickel or cobalt from the solution, but precision control of the gradual increase in the pH value between 2.5 and 3.0 is required to achieve satisfactory results and may be warranted in commercial operations.

After separation or isolation of the precipitated iron, the pH value of the solution is slowly raised to 5.0 by the addition of the same alkaline reagent viz. potassium carbonate or hydroxide. This operation precipitates the remainder of the iron together with the manganese and forty to sixty percent of the nickel and cobalt in solution. This precipitate, redissolved by slight acidulation, may be recycled to the first stage or treated separately as in the first stage, until most of the iron is removed.

The second stage yields a concentrate of nickel and cobalt with a small amount of iron. The nickel and cobalt may be separated by any of the conventional methods.

At the third stage, more alkaline reagent, potassium carbonate or potassium hydroxide, is added to raise the pH value to 6.5 which precipitates the remainder of the nickel and cobalt as basic carbonates or hydroxides in substantially pure form without contamination by magnesium or iron. The metals, nickel and cobalt may be derived or separated from the basic compounds by any of the conventional methods.

After substantially all of the nickel and cobalt is precipitated at the third stage, the pH is raised to alkalinity with a value of about 9.0 and the temperature raised to the boiling point. This operation precipitates all of the magnesium as a basic carbonate or hydroxide, which may be calcined to yield pure magnesium oxide.

The alkaline end-leach contains potassium salts of the sulphuric acid or other acid used in the treatment of the ore in addition to the excess of potassium carbonate or potassium hydroxide which may be further concentrated by evaporation. Part of the end-leach may be recycled into previous stages for the purpose of raising the pH values as a further economy in carrying out the process. The remainder of the end-leach is neutralized through the addition of an acid such, for example, phosphoric acid and concentrated for crystallization, which by-product is a valuable fertilizer.

From the foregoing, it will be apparent that simply by varying or changing the pH value of the acid leach utilizing the same reagent, four definite fractions are recoverable and three of the fractions are in a pure commercially usable form viz. iron, nickel-cobalt and magnesium. Only the fraction obtained at the second stage viz. the nickel-cobalt-iron concentrate requires further treatment to recover the individual metals. The end product of the leaching operations is a commercially usable fertilizer.

In carrying out the method of the invention, ammonia or ammonium salts may be employed for changing the pH value of the leach. However the fractions are not as sharply defined and as uniform as those obtained through the use of soluble carbonates or hydroxides. I have found by using ammonia or ammonium salts to control the pH value, that up to pH 5.0, only iron precipitates pure, and by raising the pH value to 7.5 almost all of the nickel, cobalt, some of the magnesium and the remainder of the iron is precipitated. The remaining magnesium may be precipitated by boiling off all of the ammonia from a strongly alkaline solution.

Nickel-bearing serpentinic ores of some deposits have the following general composition:

|  | Percent |
|---|---|
| $SiO_2$ | 40–45 |
| Ni | 0.3–2.5 |
| MgO | 23–28 |
| Co | about 0.01 |
| $Fe_2O_3$ | 7–10 |
| Ferrochromite | 0.5 |

The latheritic limonites are of the following general composition:

|  | Percent |
|---|---|
| $SiO_2$ | 0.3–2.0 |
| Ni | 0.5–1.5 |
| $Fe_2O_3$ | 60–79 |
| Co | about 0.01 |
| MgO | 0.5–1.0 |
| Ferrochromite | 0.5–3.0 |

The theoretical amount of sulphuric acid for the above mentioned serpentinic ore composition is 93 parts of acid (100%) to 100 parts of ore (by weight) to obtain substantially complete conversion of the nickel and cobalt to soluble compounds. I have found the very effective results may be attained in the process by utilizing a lesser amount of acid than the theoretical amount.

*Example 1*

The effect of the baking temperature on a sample of the serpentinic ore (containing 1.25% nickel) mixed with 83 parts sulphuric acid (100%) to 100 parts of finely divided ore subjected to heat for one hour and without acid leaching is shown in the following table:

| Furnace Temperature, Degrees Centigrade | Percent of Nickel extracted of the total amount present | Percent of $Fe_2O_3$ extracted of the total amount present |
|---|---|---|
| 35 | 55.0 | 36.8 |
| 100 | 96.5 | 74.8 |
| 150 | 96.4 | 80.0 |
| 200 | 95.7 | 80.0 |
| 250 | 95.7 | 71.1 |
| 300 | 97.0 | 80.0 |
| 350 | 94.2 | 73.8 |
| 400 | 92.5 | 61.8 |
| 450 | 94.2 | 55.2 |
| 500 | 92.8 | 44.7 |
| 550 | 92.5 | 52.7 |
| 600 | 90.8 | 52.0 |
| 650 | 85.1 | 12.1 |
| 700 | 86.0 | 10.8 |

From the above, it will be noted that the most efficient temperature for conversion of the nickel compounds into sulphates is between 100° centigrade and 300° centigrade, in which range the nickel yield is above 95%.

The advantage of acid leaching at pH 2.0 on the same ore and acid mixture, leached three times is shown in the following table:

| Furnace Temperature, Degrees Centigrade | Percent of Nickel extracted of the total amount present | Percent of $Fe_2O_3$ extracted of the total amount present |
|---|---|---|
| 100 | 99.65 | 75.93 |
| 150 | 97.84 | 80.00 |
| 200 | 96.48 | 80.00 |
| 250 | 97.52 | 71.10 |
| 300 | 99.32 | 80.00 |
| 350 | 98.00 | 76.90 |
| 400 | 95.20 | 63.00 |
| 450 | 94.93 | 57.84 |
| 550 | 93.92 | 57.80 |
| 650 | 86.40 | 36.83 |

The conversion of nickel to soluble salts by my method is highly efficient when less acid is employed than the theoretical amount.

The following table shows the effect of varying amounts of acid on the serpentinic ore sample heated at 300° centigrade for one hour:

| Parts of sulphuric-acid (100%) to 100 Parts of ore | Heating-time and Temperature | Percent of Nickel extracted of the total | Percent of $Fe_2O_3$ extracted of the total |
|---|---|---|---|
| 17.7 | 300° C./one hour | 44.76 | 5.61 |
| 33.6 | ---do--- | 52.38 | 6.61 |
| 46.5 | ---do--- | 73.33 | 24.58 |
| 50.0 | ---do--- | 88.77 | 36.40 |
| 83.0 | ---do--- | 97.00 | 80.00 |
| 93.0 | ---do--- | 99.50 | 83.70 |

*Example 2*

The amount of nickel extracted from a sample of limonite ore containing 1.08% nickel and 77.6% Ferrous oxide $Fe_2O_3$ for which the calculated theoretical amount of sulphuric acid (100%) is 147.3 parts per 100 parts of ore when heated at 300° centigrade for one hour with varying amounts of acid are shown in the following table:

| Parts of sulphuric-acid (100%) to 100 Parts of ore | Heating-time and Temperature | Percent of Nickel extracted of the total | Percent of $Fe_2O_3$ extracted of the total |
|---|---|---|---|
| 30.0 | 300° C./one hour | 52.78 | 13.26 |
| 40.0 | ---do--- | 54.63 | 18.13 |
| 50.0 | ---do--- | 59.26 | 51.92 |
| 75.0 | ---do--- | 65.38 | 54.57 |
| 100.0 | ---do--- | 79.20 | 58.63 |
| 147.3 | ---do--- | 97.00 | 90.38 |
| 160.0 | ---do--- | 100.00 | 94.30 |

While sulphuric acid is preferred for use in the conversion of the nickel and cobalt in the ores, any mineral acid which will produce soluble salts may be used. This group of acids includes acids such as hydrochloric acid and nitric acid.

The material employed for raising the pH value of the leach must be a compound of the alkaline group. In this group, in addition to potassium hydroxide and potassium carbonate mentioned herein, sodium carbonate, sodium hydroxide, ammonium carbonate or ammonium hydroxide may be used.

I claim:

1. A method of treating a nickel-bearing ore product wherein the nickel has been converted to a mineral salt by the addition of mineral acid including the steps of reducing the nickel-bearing product to a leachable state, initially leaching the finely divided product with an acid leach of a pH of less than 2.5, precipitating a major portion of the iron in the product, filtering the iron from the leach in the form of a basic salt, raising the pH of the leach by the addition of an alkaline reagent to 5.0 to precipitate substantially all of the remainder of the iron, filtering out the precipitate, raising the pH of the leach to 6.5 to precipitate the nickel salt, and filtering the nickel precipitate from the leach.

2. A method of treating a nickel-bearing ore product wherein the nickel has been converted to a mineral salt by the addition of sulphuric acid including the steps of reducing the nickel-bearing product to a finely divided state, initially leaching the finely divided product with an acid leach of a pH of less than 2.5, precipitating a major portion of the iron in the product, filtering the iron from the leach in the form of a basic salt, raising the pH of the leach by the addition of an alkaline reagent to precipitate the remainder of the iron, filtering out the precipitate, raising the pH of the leach to 6.5 to precipitate the nickel, and filtering the nickel precipitate from the leach.

3. A method of treating a nickel-cobalt-bearing ore product wherein the nickel and cobalt have been converted to mineral salts by the addition of mineral acid including the steps of reducing the ore product to a finely divided state, initially leaching the finely divided product with an acid leach of a pH of less than 2.5, precipitating a major portion of the iron in the product, filtering the iron from the leach in the form of basic salt, raising the pH of the leach by the addition of an alkaline potassium compound to precipitate the remainder of the iron, filtering out the precipitate, raising the pH of the leach to approximately 6.5 to precipitate the nickel and cobalt salts, and filtering the nickel and cobalt precipitate from the leach.

4. The method of treating a nickel-cobalt-bearing ore to extract nickel and cobalt therefrom including the steps of crushing the ore, mixing the crushed ore with concentrated sulphuric acid, subjecting the mixture to heat for a period sufficient to convert the nickel and cobalt into soluble salts of the acid forming a dry product, leaching the product with an acidulated water in a first stage by gradually raising the pH up to approximately 2.5, precipitating part of the iron in the ore in the form of basic salt, raising the pH from 2.5 to approximately 5.0 in a second stage to precipitate the remainder of the iron, raising the pH from 5.0 to 6.5 while heating the leach to precipitate substantially all of the nickel and cobalt in the form of insoluble compounds, and heating the leach to substantially the boiling point while raising the pH from 6.5 to 9.0 to precipitate substantially all of the magnesium constituent of the ore.

5. The method of treating a low grade nickel-cobalt-bearing ore to extract nickel and cobalt therefrom including the steps of crushing the ore, mixing the crushed ore with concentrated mineral acid, subjecting the mixture to heat for a period sufficient to convert the nickel and cobalt into soluble salts of the acid forming a dry product, reducing the dry product to a leachable condition, leaching the product in a first stage by gradually raising the pH up to 2.5, precipitating most of the iron in the ore in the form of basic salt, raising the pH from 2.5 to 5.0 to precipitate the remainder of the iron, raising the pH from 5.0 to 6.5 and heating the leach to precipitate substantially all of the nickel and cobalt in the form of insoluble compounds and heating the leach while raising the pH from 6.5 to 9.0 to precipitate substantially all of the magnesium constituent of the ore.

6. The method of treating a low grade nickel-cobalt-bearing ore to extract nickel and cobalt therefrom including the steps of crushing the ore, mixing the crushed ore with concentrated sulphuric acid, subjecting the mixture to heat of a temperature of between 50° centigrade and 700° centigrade for a period sufficient to convert the nickel and cobalt into soluble salts of the acid forming a dry product, crushing the product to a finely divided state, leaching the product in an acidulated leach in a first stage by gradually raising the pH up to 2.5, precipitating most of the iron in the ore in the form of basic salt, raising the pH from 2.5 to 5.0 to precipitate the remainder of the iron, raising the pH from 5.0 to 6.5 while heating the leach to precipitate substantially all of the nickel and cobalt in the form of insoluble compounds, and heating the leach to substantially the boiling point while raising the pH from 6.5 to 9.0 to precipitate substantially all of the magnesium constituent of the ore.

7. The method of treating ore to extract nickel therefrom comprising the steps of crushing the ore to comparatively fine particle size, mixing the crushed ore with concentrated mineral acid to form a paste, rapidly heating the mixture for less than 60 minutes at a temperature of 50° to 700° C. thereby forming a hard mass, pulverizing the mass, leaching the pulverized mass with acidulated water, raising the pH of the first leach gradually with an alkaline reagent from approximately 2.0 to no more than 2.5, removing the precipitated iron salts, raising the pH of each successive leach gradually to a pH higher than that at the end of the last leach thereby effecting further precipitation until the pH of the last leach is increased to 6.5, whereby the first removed precipitate comprises iron salts and the last removed precipitate comprises nickel salts.

8. The method of claim 7 and wherein the temperature is between 90° and 300° C. and the time is from 15 to 60 minutes.

9. The method of claim 7 and wherein the temperature is between 90° and 300° C., the alkaline reagent is from the group consisting of potassium carbonate, and potassium hydroxide, and the mineral acid is sulphuric.

10. The method of claim 7 and including the steps of aeration oxidation of the first leach and heating the first leach to approximately boiling.

11. The method of treating ore to extract nickel therefrom comprising the steps of crushing the ore to comparatively fine particle size, mixing the crushed ore with concentrated mineral acid to form a paste, rapidly heating the mixture for less than 60 minutes at a temperature of from 90° to 300° C. thereby forming a hard mass, pulverizing the mass, leaching the pulverized mass with acidulated water a plurality of times, raising the pH of the first leach gradually with an alkaline reagent from about 2.0 to no more than 2.5, first stage precipitating iron salts, raising the pH of the leach from 2.5 to 5.0, second stage precipitating iron, nickel, and cobalt salts, recycling the second stage precipitate to the first leach, raising the pH of the second stage leach to no more than 6.5, third stage precipitating nickel and cobalt salts, raising the pH of the leach to 9.0, fourth stage precipitating the magnesium as a basic carbonate of hydroxide, recycling part of the end leach to earlier stages, and crystallizing the remainder of the end leach to produce fertilizers.

12. The method of claim 11 and wherein the alkaline reagent is from the group consisting of potassium carbonate and potassium hydroxide, and the mineral acid is sulphuric.

13. The method of claim 11 and including the steps of aeration oxidation of the first leach and heating the first leach to approximately boiling.

References Cited in the file of this patent

UNITED STATES PATENTS

| | | |
|---|---|---|
| 1,091,545 | Sulman et al. | Mar. 31, 1914 |
| 2,647,827 | McGauley | Aug. 4, 1953 |